Nov. 4, 1952                 B. L. WELLER                 2,617,023

APPARATUS FOR DETECTING THE PASSAGE OF AN OBJECT

Filed Aug. 17, 1948                                       2 SHEETS—SHEET 1

INVENTOR.
B. L. WELLER
BY
John H. Lewis Jr.
ATTORNEYS

Nov. 4, 1952 — B. L. WELLER — 2,617,023
APPARATUS FOR DETECTING THE PASSAGE OF AN OBJECT
Filed Aug. 17, 1948 — 2 SHEETS—SHEET 2
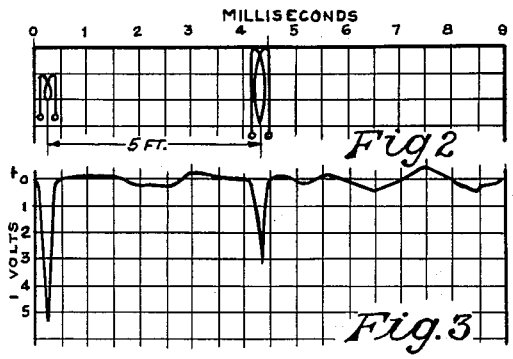
Fig. 2
Fig. 3
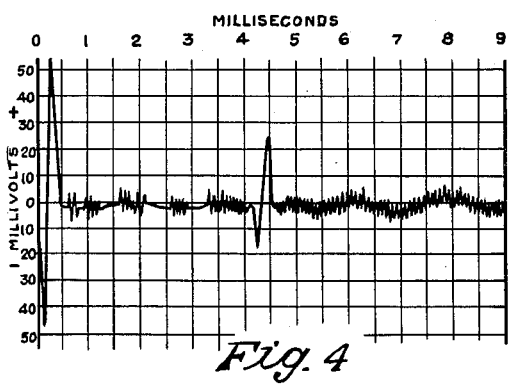
Fig. 4
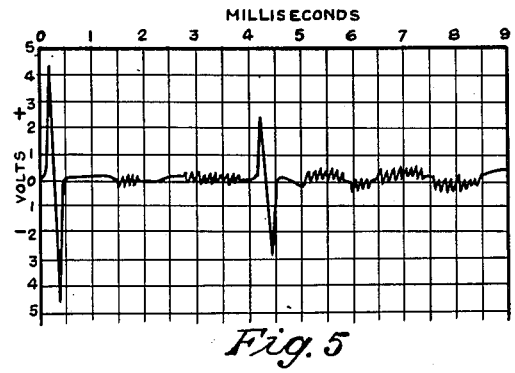
Fig. 5
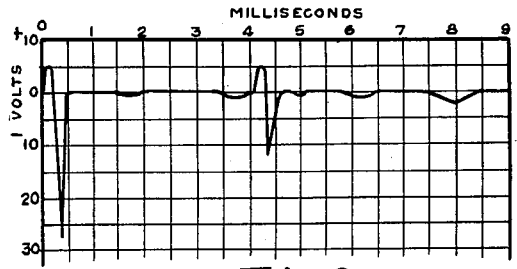
Fig. 6
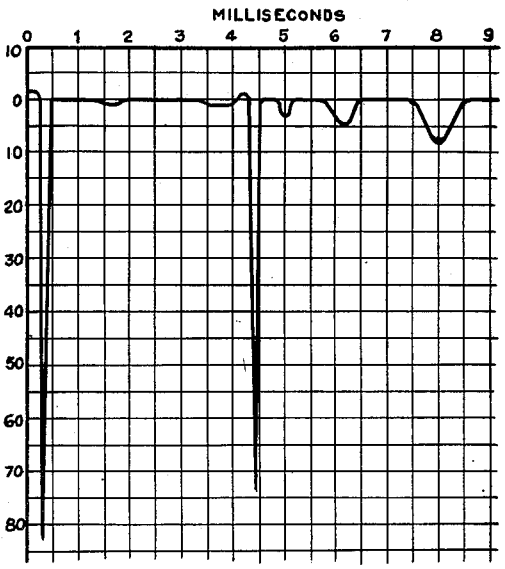
Fig. 7
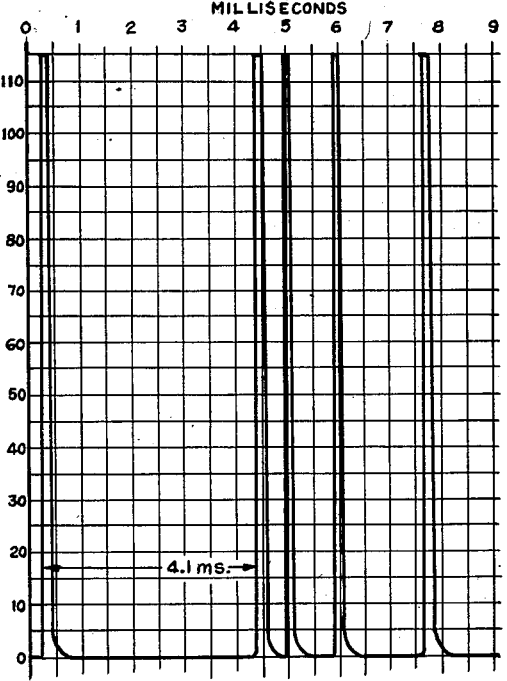
Fig. 8
INVENTOR.
B. L. WELLER
BY
John H. Lewis Jr.
ATTORNEYS.

Patented Nov. 4, 1952

2,617,023

UNITED STATES PATENT OFFICE 2,617,023

APPARATUS FOR DETECTING THE PASSAGE OF AN OBJECT

Barton L. Weller, Stepney, Conn., assignor to Remington Arms Company, Inc., Bridgeport, Conn., a corporation of Delaware Application August 17, 1948, Serial No. 44,723

7 Claims. (Cl. 250—27)

This invention relates to apparatus for detecting with great accuracy the exact instant at which an object passes through a given point without contacting such article or in any way impeding its passage. This invention is an improvement upon that illustrated in Patent No. 2,301,194 to C. I. Bradford, dated November 10, 1942, and combines into one unit apparatus for performing the functions of two or more of the units shown in the patent. Although the invention is not limited thereto, it will be specifically described by reference to one of its most useful functions which is that of detecting the flight of a projectile past one or more points and providing an indication of such passage in a form suitable for the operation of chronographs or other measuring instruments. The invention is particularly useful with a group of discrete projectiles such as are found in a shot shell and with such projectiles is responsive to the passage of the center of mass of the group of projectiles.

It will readily be appreciated that velocity, as ordinarily measured in terms of the time required to traverse a given distance, is not an instantaneous velocity but only represents an average over the particular distance. The shorter the space over which the time of flight can be measured the nearer a measurement comes to representing a true instantaneous velocity. Thus, while ballistics tables, literature, etc. refer to muzzle velocities of projectiles they speak actually of average velocities over a standard distance. Shot shell velocities have, for example, ordinarily been measured over a range of 40 yards.

Prior testing means based on comparatively large distances not only are misleading in that they fail to provide substantially instantaneous velocities but they require the provision of extensive ranges which are difficult to fit into production facilities and which would not otherwise be necessary for routine function and ballistic testing.

The arrangement shown in the Bradford patent, previously referred to, falls short of the ideal in that it takes a comparatively long time for the registration of one projectile to settle out of the circuit. Hence, if velocity measurements over short distances are desired, it is necessary to use a separate complete unit to provide the signal from each position.

It is, therefore, an object of this invention to provide an apparatus capable of giving an exact indication of the presence of an object, or the center of mass of a plurality of closely grouped objects, at a given point and which will be capable of giving an equally exact indication of the presence of the same object or objects at one or more other points, even though all of such points may be passed within a few milliseconds.

It is a more specific object to provide an instrument which is capable of producing a sharply defined electrical pulse coincident with the arrival of a projectile or other moving object of any velocity, and of any practical size or material, at each of one or more points in space, which points may be quite closely adjacent to each other.

Another object is the provision of apparatus which, within practical ranges, is independent of the size, velocity, and any other characteristic of the travelling object or objects with the exception that the objects must be electrically conductive.

Other objects are the provision of apparatus for detecting the passage of travelling objects which will reset itself after each operation and which will be, to a large extent, immune to spurious signals which might be generated by supply voltage instability, high frequency interference pickup, or other disturbing factors.

It is contemplated that these objectives may be accomplished by the provision of a coil through which the object may pass at each of the desired points, each of these coils being incorporated in the oscillatory circuit of a high frequency oscillator. It is a well-known fact discussed in the patent above referred to and elsewhere that the introduction of a projectile or other electrically conductive object or objects into the magnetic field of such a coil loads the oscillator in a manner which causes a variation in the plate current of the oscillator. Additional coils may be connected to such a circuit in any desired number consistent with the output of the oscillator. The peak of the fluctuation in oscillator plate current will be coincident with the arrival of the exciting object at the electrical center of the coil affected. It is contemplated that this signal may be differentiated, amplified and limited in a particular way and applied as the controlling signal to a suitable multivibrator circuit to produce a square wave pulse of short time duration which starts coincidentally with the time the object passes through the electrical center of a particular coil and settles out before the object can reach a closely adjacent coil. This permits the measurement of average velocities over such short distances that practically instantaneous velocities are obtained and makes it possible to secure much valuable ballistic data in regard to deceleration, etc. heretofore not available. Center fire rifle projectiles of very high velocity may, for example, be measured with great accuracy over such short distances as 5 feet. The multivibrator pulse may be applied to any suitable chronographic instrument arranged to measure the time between two successive electrical impulses. Counter type chronographs which count the number of cycles of a precision 100,000 cycle oscillator are particularly useful and one such instrument is disclosed in Patent No. 2,301,197. Other suitable instruments are available from the Potter Instrument Company, identified as counter chronograph interval timers, and from the Radio Corporation of America. Patents No. 2,403,918 and No. 2,434,153 refer to certain features of the instruments of the latter organization.

The exact nature of the invention as well as other objects and advantages thereof will become more clearly apparent from consideration of the following drawings, in which:

Fig. 1 is a schematic circuit diagram.

Fig. 2 is a diagrammatic showing illustrating the spacing between typical projectile coils. This diagram has been superimposed on a time scale for projectiles having, for the purpose of this example, a velocity of substantially 1219.5 feet per second.

Fig. 3 is a graphical plot of voltage with respect to time, showing typical values of oscillator pulse voltages as a charge of shot passes successively through coils spaced as in Fig. 2.

Fig. 4 is a similar illustration showing the effect of differentiating the pulses shown in Fig. 3.

Fig. 5 is a similar illustration showing the effect of amplification and inversion upon the pulses.

Fig. 6 is a similar illustration showing the effect of cutoff limiting in the first stage of limiter amplification.

Fig. 7 is a similar illustration showing the output of the second limiter amplifier.

Fig. 8 is a similar illustration showing typical multivibrator output.

Referring to the drawings by characters of reference, it may be seen that that portion of Fig. 1 which is enclosed within the dotted lines constitutes a radio frequency oscillator comprising a frequency controlling crystal 10, an oscillator tube 11, and a plate inductance 12 inductively coupled to an inductance 13 which is tuned by a variable condenser 14. This portion of the circuit, it will be noted, comprises a substantially conventional R. F. oscillator. Although a certain specific type of tube and other components are shown on the diagram, this oscillator may be replaced by any other stable conventional R. F. oscillator. Conveniently, the frequency of oscillation may be on the order of 3500 kilocycles per second, although within a fairly wide range any radio frequency may be utilized. Obviously, the possibility of outside radiation cannot be ignored, although the work circuits are not well adapted for radiation and ballistic ranges are generally well adapted for absorbing such radiation. Under ordinary conditions, no special precautions need be taken and it will generally suffice to simply verify that no unusual conditions favorable to outside radiation are allowing a signal to escape where it may interfere with other local services.

The inductance 13 may be link-coupled by suitable lines to the desired number of electrically similar inductances 15 and 16 respectively tuned by variable condensers 17 and 18. These are the bullet coils located at suitably spaced points along the trajectory and so oriented that the projectile, or projectiles in the case of shot, pass through the coils. An armor plate shield having a hole slightly smaller than the diameter of the coil may conveniently protect the coils from gunner's mistakes. For maximum sensitivity, each coil circuit should be designed for the maximum attainable "Q," although as noted in the succeeding paragraph, sensitivity requirements may vary with coil location.

Obviously a coil which is located near the muzzle may be smaller in diameter, and, because of its inherently greater sensitivity as a result of this more favorable ratio of coil diameter to projectile diameter, need not be tuned as sharply. In many cases, a muzzle coil will be adequately sensitive to permit operation with a stable fixed condenser 17 of the vitreous dielectric or other rugged type. This is a great advantage, for the muzzle coil and its associated condenser are necessarily subject to the sound wave of the muzzle blast and to the unpredictable effects of ionized gases. In the case of coils spaced at greater distances from the muzzle, it is desirable and absolutely necessary in the case of multi-missile projectile to provide a coil of greater inside diameter. The increase of diameter makes the coil inherently less sensitive, which must be compensated for by sharper tuning. In the case of shot shell work, it is sometimes necessary, as illustrated in the curves, to tune the second coil so sharply as to render it susceptible to microphonics generated by the muzzle blast, with the result that the multivibrator will be triggered repeatedly after the second pulse. While such triggering is immaterial in the case of simple two-point velocity measurements, it does limit the applicability of the apparatus to multistation deceleration measurements, where large diameter coils tuned to great sensitivity are employed. With solid projectiles the diameter of the coils within reach of the muzzle blast may be kept down to a point where highly sensitive sharp tuning need not be employed and several coils may be utilized for deceleration measurements by oscillographic or other methods.

The oscillator will preferably be so tuned that the inductances 12 and 13 will be slightly more inductive than required to resonate with the natural frequency of the crystal 10, and the bullet coils may each be similarly tuned. As noted above, however, a muzzle coil does not need to be sharply tuned. By such tuning the operating point on the resonance curve for the RC combination is moved from the peak of the resonance curve to a position on the slope of the steeper portion of the curve. The nearer the peak, the greater the sensitivity, but consistent results require that operation always be on the same side of the peak. Hence, the exact peak should not be too closely approached. The milliameter 19 in the plate supply lead to the oscillator serves as a convenient means of indicating resonance, showing a minimum plate current when the coils are tuned to resonance and higher currents when turned off resonance on the steeper portion of the curve.

During the operation of the oscillator each of the bullet coils sets up an intense high frequency magnetic field and as the bullet or other metallic object passes through this field it reacts in the same fashion as though a short circuited coil had been inductively coupled thereto. Everitt, "Communication Engineering," first ed., pages 201 and 202, shows that placing metal in the field of a coil increases the effective resistance of the coil and decreases the effective inductance of the coil.

These changes in the effective characteristics of the coil result in decreasing the circuit Q and flattening the resonance curve. As the bullet moves into and through the coil, the coupling with the coil increases and is at a maximum when the bullet is half-way through. One of the fundamental considerations in coupled circuits is that the closer the coupling the lower will be the circuit "Q." The considerations due to the nature of the bullet coupled in as a secondary circuit and the effect of the varying coupling as the bullet moves through the coil combine to give a minimum circuit Q at the exact instant the bullet passes through the center of the coil. As a result of the change in the effective "Q" of the coil circuits, a minimum effective impedance to the flow of current from the oscillator is presented when the bullet is in the center of the coil and this change may be observed, when it takes place slowly, as an increase in the oscillator plate current recorded on the milliameter 19. For obtaining the speed of response necessary for ballistic purposes, the increase in oscillator plate current must be detected electrically and may conveniently be detected as a function of the voltage drop across the resistor 20, as indicated at point 21. The voltage pulse at this point will be a negative pulse having its maximum negative value when the bullet is halfway through the coil. Illustrative values extending over a time interval of substantial 9 ms. are plotted in Fig. 3.

When this apparatus is used with multi-missile projectiles such as employed in shotguns, the peak of the oscillator pulse wave will correspond to the center of mass of the shot charge. The curves plotted are the result of firing tests on a full choke shotgun which is constricted at the muzzle to cause it to shoot a more concentrated pattern. The shot column from such a barrel is elongated or squirted forwardly in a longitudinally dispersed stream as it comes through the muzzle while the rearmost portion of the charge remains compact and is sharply defined by the plane of the wad upon which the powder gas acts. It is interesting to note that the oscillograms reproduced in the drawing detect that difference in the form of a more gradual slope as the oscillator pulse builds up, while it drops off much more sharply. The variations in voltage following the second pulse are apparently due to microphonics, probably in the tuning condenser, as the muzzle blast reaches the second coil location.

From observation of the waves shape recorded in Fig. 3, it will be apparent that the gradual slope of the curve does not lend itself readily to direct detection of the exact time at which the bullet is in the center of the coil, for such a pulse may start to gradually build up while the bullet is several inches from the coil and its peak magnitude is dependent, to a large extent, upon the size and nature of the projectile. Fortunately, differentiation of the negative pulse can produce an alternating pulse which passes through zero at substantially the instant the negative pulse reaches its maximum negative value. A differentiator circuit has been defined as one which produces an output voltage, the amplitude of which is proportional to the rate of change of the input voltage. It is exactly this action which is needed, for the rate of change of the oscillator plate current fluctuation is zero only when the center of mass of the projectile, projectiles, or other object or objects is at the center of the coil. Differentiation is accomplished by the use of a capacitor 22 and resistor 23 connected in series between point 21 and ground. Alternating current theory shows that the current passing through a capacitor leads the impressed voltage by an angle whose tangent is the ratio of the reactance of the condenser to the resistance. Since the voltage drop across a resistance is in phase with the current passing through it, the voltage drop across resistor 23 to ground will lead that between point 21 and ground by the same phase angle referred to above. The values of resistor 23 and capacitor 22 should, therefore, be chosen to secure substantially 90° phase shift at the fundamental frequency of the pulse from the oscillator. Values on the order of those shown give substantially 90° phase shifts but it is emphasized that particular values shown on the drawing are to be considered as illustrative rather than limiting. The wave shape of the voltage across resistor 23 comparable to the condition previously illustrated in Fig. 3 is plotted in Fig. 4. It will be noted that although the wave has been severely attenuated, it passes through zero simultaneously with the maximum negative excursion of the voltage pulse at the oscillator output. It is of interest to note that the effect of the choke of the barrel is again apparent in the lower value negative loops of the differentiated pulses.

Sensitive electronic equipment in industrial areas seems to be prone to pick up high frequency interference from induction motors, etc. such as that indicated in Fig. 4 superimposed upon the normal voltage trace. This interference often has a fundamental frequency measurable in megacycles and its elimination has been found practicable without adversely affecting the response of the circuits to signals of the desired frequencies. Accordingly, the first of several interference by-passing capacitors 26 may be connected between the control grid of the high gain amplifier 24 and ground to shunt off as much as possible of the interference. Preferably, the leads should be as short as possible with the connection being made directly to the grid terminal. Since the usual chronograph counts in units of $1/100,000$ seconds, any signals of a frequency greater than 100,000 may be attenuated without affecting accuracy. A value of capacity such as that shown on the drawing offers an impedance of less than 100,000 ohms to 100,000 cycle components of the signal when measured between the grid and ground, and has been used successfully. However, variations may be made therefrom, depending upon the nature of the local interference and the results of oscillographic observation of the wave shapes involved.

The differentiated pulse is applied to the grid of an amplifier tube 24 which has the function of overcoming, at least in part, the severe attenuation as a result of differentiation. This tube and its connections are conventional and may be replaced by any stable, high gain amplifier; a pentode tube is preferable although not essential. As an incident to amplification, the signal is inverted. Wave shapes and voltage values corresponding to those illustrative values plotted for the earlier stages are shown in Fig. 5.

The succeeding two sections are identical and each comprises two stages which may be generally described as cathode coupled, self-biased, limiter amplifiers having the function of substantially eliminating the positive pulse while providing a fairly high degree of stable amplification of the negative pulse. These units may each employ one of a pair of twin-triode tubes 25 and 25a or each unit may employ a pair of conventional triodes. By their action, the alternating pulse amplified and inverted by tube 24 is converted into a very steep wave front negative pulse which starts simultaneously with the passage of the bullet through the center of the coil. To insure that high frequency transients, previously referred to, do not mask the desired signals, the relatively small by-pass capacitors 26 may be connected between each input control grid 27 and ground to shunt off such high frequency interference.

To secure virtual independence of 60 cycle hum, voltage drift, and other low frequency variations, it is desirable to limit the low frequency response of the amplifiers. This is most conveniently done by the employment of relatively small interstage coupling capacitors. Values on the order of .001 mfd. which offer an impedance of greater than 1 megohm to signal components of less than 100 cycles have, as illustratively shown on the drawing, been used successfully. However, as in the case of the high frequency by-pass capacitors 26, variations may be made and permissible limits determined by oscillographic observations.

Although these amplifiers, at first glance, appear to be generally similar to a relatively common cathode coupled paraphase amplifier, several important distinctions should be noted. Examining each of these units in detail, it will be noted that the first grids 27 are returned to a tap on the common cathode resistor 28 at a point considerably less negative relative to cathode 29 than that to which the second grids 30 are returned. A second distinction is the omission of a plate load resistor from the connection to the first plate 31 while the second plate 32 is provided with the usual load resistor 33. The first section of each tube may therefore be regarded as a cathode follower to which the second section is cathode coupled.

In the operation of the circuit it will be seen that under quiescent conditions, plate 31 carries a considerably higher plate current than plate 32, since plate 31 has no plate load resistor and grid 27 is less negative with respect to cathode 29 than grid 30. It might seem desirable to carry the values of biasing resistor 28 to the point where the current through resistor 28 causes sufficient voltage drop to bias grid 30 to cutoff under zero or positive signal conditions. In practice, however, it is preferable not to provide complete limiting of the positive signals in order to insure that under any conditions the steep wave of a negative pulse will commence exactly on the cross-over point of the alternating input wave.

The limiting action takes place in this way. As noted previously, the major flow of current under quiescent conditions is to plate 31, and grid 27 has a relatively small negative bias imposed thereon. When a positive signal arrives at grid 27 there is a tendency for the grid to swing positive. Since the first section of the tube functions as a cathode follower, the cathode will simply follow the incoming signal at the grid in phase with it, which, in effect, tends to reduce the voltage difference between grid and cathode as normally established by the input signal. As a result, the grid cannot swing positive. As the cathode 29 follows the grid during the positive swing of the signal, it will increase the negative bias upon grid 30 and tend to reduce the current passing to plate 32. However, since the bias on grid 30 is normally near the cutoff value, such positive signals will quickly drive the grid 30 to cutoff and will have very little effect upon the current to plate 32. This sort of action may be termed "cutoff limiting." To insure that the output pulse always starts exactly when the bullet is in the center of the coil, a slight positive pulse may be tolerated and "cutoff limiting" is not complete. In this way, each of the limiter amplifiers discriminate against a positive signal and, as shown in Figs. 6 and 7, very nearly eliminate it from the output of the unit.

Negative signals, however, receive a slightly degenerative amplification in a reduction of current passing to plate 31. This reduction in plate current, as in the usual cathode follower, lowers the voltage drop across the common cathode resistor 28, bringing the cathode 29 nearer ground potential. Since the grid 30 is at ground potential, any tendency of the cathode to decrease its positive potential has the effect of raising the potential of the grid 30 to a value less negative relative to cathode 29 and thereby the flow of current passing to plate 32 and plate load resistor 33 will be increased. This second section of the tube functions as a regular triode amplifier which is cathode coupled to a signal source. The output of the unit is taken from plate 32 and is a function of the voltage drop across the load resistor 33. Thus, it will be seen that a negative input to grid 27 tends to increase the voltage drop across load resistor 33 and hence produces an amplified negative pulse of the same wave shape as the negative portion of the input pulse.

The second limiter amplifier 25a repeats the above process of discriminating against the positive pulse and amplifying the negative pulse. As the negative pulse commences exactly at the cross-over point of the original alternating input pulse and has been highly amplified, we secure, for all practical purposes, a wave front falling almost vertically from this cross-over point to a value far more negative than required for triggering the succeeding stage. By this combination of drastic limiting and high amplification, it is possible to secure practical independence of the magnitude of the input pulse from the oscillator. Even the relatively weak pulse from a caliber .22 bullet may be so amplified to produce an adequate pulse and even though the pulse from a caliber .50 bullet or other large projectile may be amplified to a much higher peak value, the shape of the wave or the time required for the negative pulse to reach any specified reference level will not be measurably different. The limited voltage pulses are plotted in Figs. 6 and 7, the voltage values shown being illustrative only and comparable with the similar values shown for the earlier stages. These voltages illustrate those which have been measured respectively at the plate 32 of the first limiter tube 25 and at the plate 32 of the second limiter tube 25a.

The final unit may comprise a dual triode tube 35 similar to the tubes 25 or may comprise a pair of similar triodes of conventional form. Although this unit bears general resemblance to those last mentioned, its connections are such that it functions as a trigger circuit to give a sharp positive pulse rising practically instantaneously to a maximum value, remains at or near such maximum value for a definite predetermined period regardless of the magnitude or shortness of duration of the input signal, and returns practically instantaneously to its original value. The output pulse is essentially a square wave and the circuit is a modification of the basic Eccles-Jordan trigger circuit which, it will be recalled, is a circuit possessing two states of stable equilibrium which can be instantaneously interchanged. The circuit illustrated here is a member of the "one shot" multivibrator family in that it has only one stable state and when triggered by an input reverses itself for a definite time interval, after which it returns automatically to its original stable condition.

Tracing the circuit, it may be seen that the twin triode tube 35 includes a common cathode 36 or, in the case of the obviously equivalent pair of separate triodes, a pair of cathodes connected together. The first grid 37 receives the input signal and is biased slightly negative from a tap on the cathode resistor 38. The plate 39 is connected to a source of potential through a plate load resistor 40. This section of the tube is normally carrying current in the stable condition of equilibrium and the amount of that current is determined by the bias imposed on the grid 37. Although it will be recalled that the positive pulse has been practically eliminated from the signal, it will be noted that any positive signal which survives the limiting action may be applied to the grid 37 without upsetting the condition of stable equilibrium since the only effect of such a pulse is to increase the flow of current in the normally conductive section of the tube.

A negative pulse on grid 37 would, on the other hand, be immediately and completely effective in reducing the flow of current to plate 39, thus swinging plate 39 sharply positive. Since plate 39 is coupled through capacitor 41 to second grid 42 and, since it is a known fact that a capacitor cannot charge instantaneously to a new value, grid 42 must swing positive with plate 39. Grid 42, in the stable state, is biased to a value below cutoff by the drop across cathode resistor 38, but as the grid follows plate 39 positive, a flow of current will be initiated to the second plate 43. The extent to which grid 42 is below cutoff determines the sensitivity of the multivibrator or the threshold value of signal which will upset the condition of stable equilibrium. The current flowing to plate 43 is not limited by a plate load resistor and this current will be materially greater than any that could flow in the stable state. This increased current increases the negative bias on grid 37 and aids the negative input pulse in driving grid 37 below cutoff potential. While these actions have been described as taking place sequentially, it is a known fact that the changeover of any multivibrator circuit is substantially instantaneous and that the transfer of current from plate 39 to plate 43 will be immediate and complete. This reversed state will continue to exist until the coupling capacitor 41 has been charged by current flowing through the second grid resistor 44 and through grid current drawn by the grid 42 to substantially the potential of the plate supply. As this condition is reached, the voltage of grid 42 falls toward the ground potential, reducing the current flowing to plate 43. The length of time during which the unstable condition of equilibrium persists is obviously dependent upon the RC time constant of the coupling capacitor circuit which should be chosen to provide a pulse which persists long enough to operate the time indicating or other controlled apparatus.

As the current to plate 43 commences to diminish, the negative bias on grid 37 which is dependent thereon is decreased and current commence to flow to plate 39. As this happens, plate 39 swings negative and coupling capacitor 41, which cannot discharge instantaneously, causes grid 42 to swing to a negative value with respect to ground, with the result that current to plate 43 is abruptly cut off and the tube returns to its stable state. As before, the changeover is complete and substantially instantaneous. The coupling capacitor will discharge itself in a length of time determined by its RC time constant after which the circuit will be ready for another pulse. Should succeeding pulses due to microphonics, interference, etc. be received before the coupling capacitor has almost completely discharged, the trigger circuit will not respond.

In considering what has taken place in this "one shot" multivibrator unit, it will be apparent that a square wave pulse may be taken from any point in the plate cathode circuit of the normally non-conductive section of the multivibrator. For convenience and to secure a low impedance output readily coupled to the chronographs, this output is preferably taken across a portion of the cathode resistor 38. A blocking capacitor 45 may be utilized to isolate the output from the voltage drop due to the stable state current of the tube, with the result that the output pulse will be square wave in form and will represent the increased voltage drop across that portion of the cathode resistor due to the surge of current passed to the second plate 43 during the period of reversal of the multivibrator. Such a series of pulses, illustrative of those which may be obtained when the multivibrator is triggered with input pulses of the type shown in Fig. 7, is plotted in Fig. 8.

It will be noted that in the case illustrated, the multivibrator circuit has triggered repeatedly after the second timing pulse as a result of microphonics and other interference acting upon the second coil which, in the case illustrated, was a large diameter coil adapted for use with shot charges. As has been previously noted, such a coil must be tuned to very nearly the resonance peak in order to obtain an adequate signal. Such sharp tuning, while increasing the magnitude of the signal, has a similar effect upon interference microphonics, etc., which are also more readily picked up by the larger coil and by the necessarily adjustable tuning capacitor. For velocity measurements, such multiple tripping is immaterial for the commercially available chronographs are arranged to be started by one pulse and stopped by a second pulse. Succeeding pulses do not affect the operation until the start-stop channels have been manually cleared. Since the only commercial cartridges which have muzzle velocities lower than the speed of sound are low energy, single projectile cartridges for .22 rifles and for various centerfire revolvers and pistols, it is a simple matter to use with these cartridges coils capable of giving favorable signal to interference ratios and having response characteristics similar to those of the muzzle coil in the example illustrated. This assures that even with these low velocity projectiles, the multivibrator will not be tripped by microphonics in advance of the arrival of the projectile. With high energy cartridges capable of causing microphonic disturbances of considerable magnitude, the muzzle velocity is always greater than the speed of sound and a microphonics pulse can never precede tripping by the projectile itself.

In an illustrative arrangement, two bullet coils have been provided spaced by a distance of five feet. One of these coils is usually placed immediately forward of the muzzle of the gun firing the test projectile and the other coil is suitably aligned with the trajectory. With such an arrangement, it is possible to measure velocities in excess of 4,000 feet per second, for even at the latter velocity there is still a time spacing of 1¼ milliseconds or 125 impulses of the chronograph oscillator between the successive pulses. Such velocities are well above the maximum encountered in commercial production. Strictly speaking, the velocity measured in this way is still an average velocity but when measured over a distance of only five feet, may be considered within tolerable error to be an instantaneous velocity midway between the coils.

As has been previously noted, additional bullet coils may be coupled in to provide successive indications of the passage of the bullet through one or more additional locations. If the coils are kept of small diameter so that the signal to interference ratio is favorable, the only limitations to the number of such coils are those imposed by the power output of the oscillator and the losses in the coils and connecting lines. One illustration of the utilization of multiple coils might be found in coupling the output of the disjunctor with multiple coils to the vertical input of a recording single sweep oscillograph. From the spacing of the successive pulses in the oscillograph record, it would be possible to determine decelerations and other ballistic data with considerable accuracy over a considerable portion of the trajectory. In this way there can be eliminated many of the errors inherent in averaging the results of multiple observations of a succession of projectiles which can never quite be ballistically identical.

The arrangement specifically disclosed herein is intended to be illustrative only of a presently preferred embodiment of the invention. It is not intended that this disclosure be construed as a limitation upon the scope of my invention which is set out in the claims appended hereto.

I claim:

1. A device for detecting the instant at which a travelling electrically conductive object passes in succession each of a plurality of given points comprising a coil at each of such points, each coil surrounding a portion of the path travelled by such object; a single generator of high frequency electrical oscillations coupled simultaneously to all of said coils to produce an alternating magnetic field within and surrounding each coil, the passage of an electrically conductive object through each coil disturbing the field within that coil and producing a fluctuation in the output of said generator which rises to a maximum value as the object passes through the center of that coil, a similar fluctuation in generator output being produced as the object passes in succession through each of the plurality of coils; and electrical signal pulse producing means coupled to said generator and responsive to each of such travelling object induced fluctuations in the generator output to produce from each such fluctuation a unidirectional signal pulse commencing at substantially the same instant as that in which each such fluctuation of the generator output reaches its maximum value.

2. The device described in claim 1, said signal pulse producing means including an arrangement to limit said signal pulse to existence during a definite predetermined time interval shorter than the time interval between successive travelling object induced fluctuations of generator output.

3. The device described in claim 2, said last-mentioned means including a one-shot multivibrator arranged to produce square wave pulses of predetermined magnitude and time duration.

4. The device described in claim 3, said signal pulse producing means and said multivibrator being coupled to each other through coupling capacitors, each of which presents an impedance of greater than one megohm to the transmission of components of said signal pulse having a fundamental frequency component substantially less than 100 cycles per second and at least one by-pass capacitor associated with said coupling capacitors and presenting an impedance to ground of less than one hundred thousand ohms for those components of said signal pulse having a frequency substantially greater than 100,000 cycles per second whereby low frequency drift disturbances will not be transmitted through the coupling capacitors and high frequency interference will be shunted out to ground through the by-pass capacitors.

5. The device described in claim 1, said signal pulse producing means including a differentiator to derive an alternating voltage from said generator output fluctuation, which voltage passes through zero between the first and second half cycles of its alternation when said fluctuation has its maximum value; means to amplify said alternating voltage and to limit that portion of the alternating voltage which precedes the passage of said alternating voltage through zero; and a square wave vacuum tube pulse generator arranged to be energized by the amplified portion of said alternating voltage which follows the passage of said alternating voltage through zero.

6. The device described in claim 5, said pulse generator comprising a one-shot multivibrator arranged to return to its stable condition after a predetermined interval of time without the intervention of any outside agency.

7. A device for detecting the instant at which a travelling electrically conductive object passes in succession each of a plurality of given points comprising a coil at each of said points surrounding a portion of the path travelled by said object; a single generator of high frequency electrical oscillations coupled simultaneously to all of said coils to produce an alternating magnetic field within and surrounding each coil, the passage of the electrically conductive object through each coil producing a disturbance in the magnetic field of that coil, each of which disturbances are reflected as a fluctuation in generator output which has its maximum value as the object passes through the center of the coil; a differentiating and inverting circuit coupled to said generator to derive an alternating voltage from said generator output fluctuation, which alternating voltage rises to a positive value and then passes through zero when said fluctuation is at a maximum value; electrical amplifying and limiting circuit means coupled to the output of said differentiating and inverting circuit to amplify the negative portion of said alternating voltage and to limit the positive portion of the said alternating voltage which precedes the passage of said alternating voltage through zero; and a pulse generating vacuum tube circuit coupled to the output of said amplifying and limiting circuit and arranged to be activated by the amplified portion of said alternating voltage, said pulse generating circuit comprising first and second vacuum tube devices each including an anode, a cathode, and a control electrode, the amplified portion of said alternating voltage being applied to the control electrode of said first tube device; a source of direct current potential; a load resistor; electrical circuit means connecting the anode of said first device through said load resistor to a positive point on said source of potential; electrical circuit means connecting the anode of said second tube device directly to a positive point on said source of potential; electrical circuit means connecting together the cathodes of said tube devices; a common cathode resistor connecting said interconnected cathodes to a negative point on said source of potential; resistive electrical circuit means connecting the control electrode of said second tube device to a negative point on said source of potential which is more negative than the common cathodes by an amount sufficient to cause cutoff in said second tube device; capacitance means connecting the control electrode of said second tube device to the anode of said first tube device; electrical circuit means connecting the control electrode of said first tube device to a point on said common cathode resistor only slightly more negative than said cathodes; and means to derive from said cathode resistor separate successive undirectional signal pulses each commencing substantially simultaneously with the arrival of said electrically conductive object at each of said given points.

BARTON L. WELLER.

REFERENCES CITED

The following references are of record in the file of this patent:

UNITED STATES PATENTS

| Number | Name | Date |
|---|---|---|
| 1,895,774 | Smets | Jan. 31, 1933 |
| 2,150,430 | Drenkard | Mar. 14, 1939 |
| 2,301,194 | Bradford | Nov. 10, 1942 |
| 2,325,927 | Wilbur | Aug. 3, 1943 |
| 2,332,300 | Cook | Oct. 19, 1943 |
| 2,369,659 | Carr | Feb. 20, 1945 |
| 2,373,145 | Sensiper | Apr. 10, 1945 |
| 2,400,189 | Carlson | May 14, 1946 |
| 2,442,304 | Mayle | May 25, 1948 |
| 2,459,852 | Summerhayes | Jan. 25, 1949 |